Patented Jan. 2, 1934

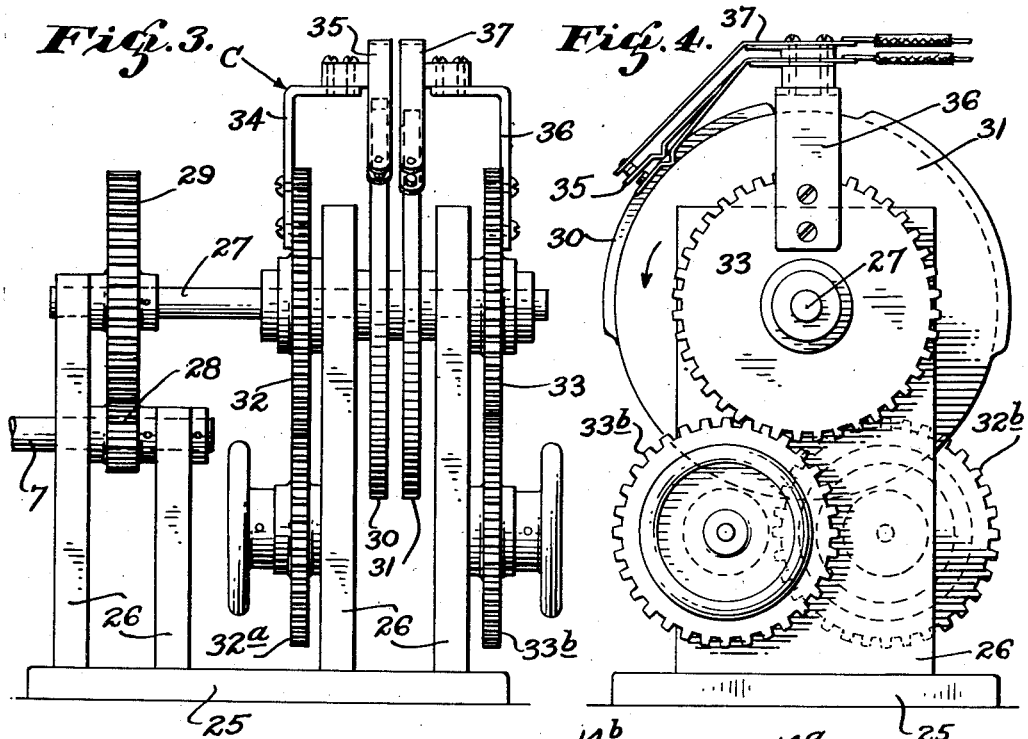
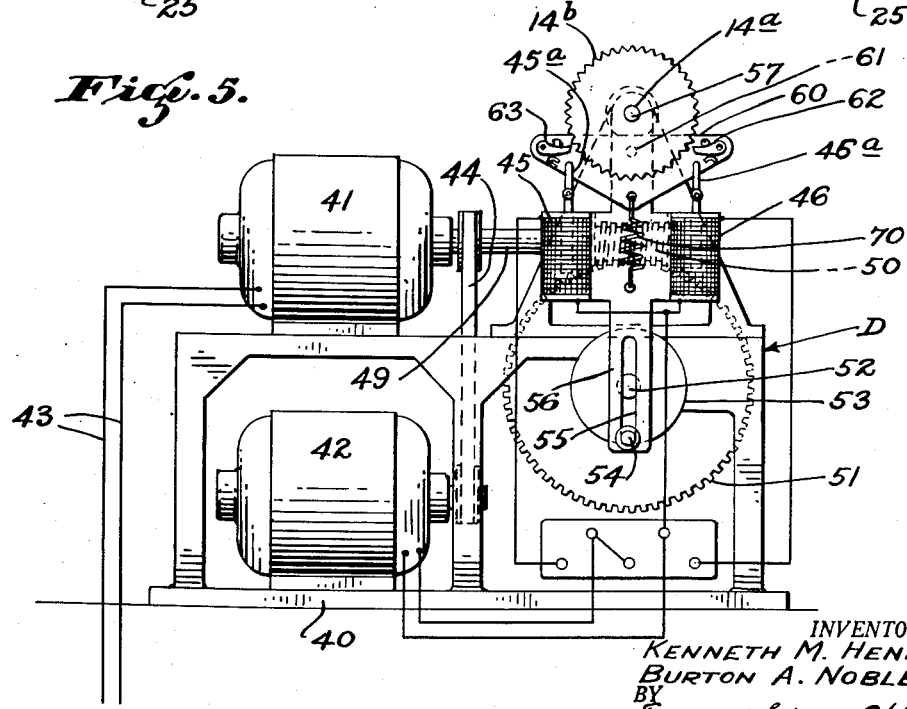

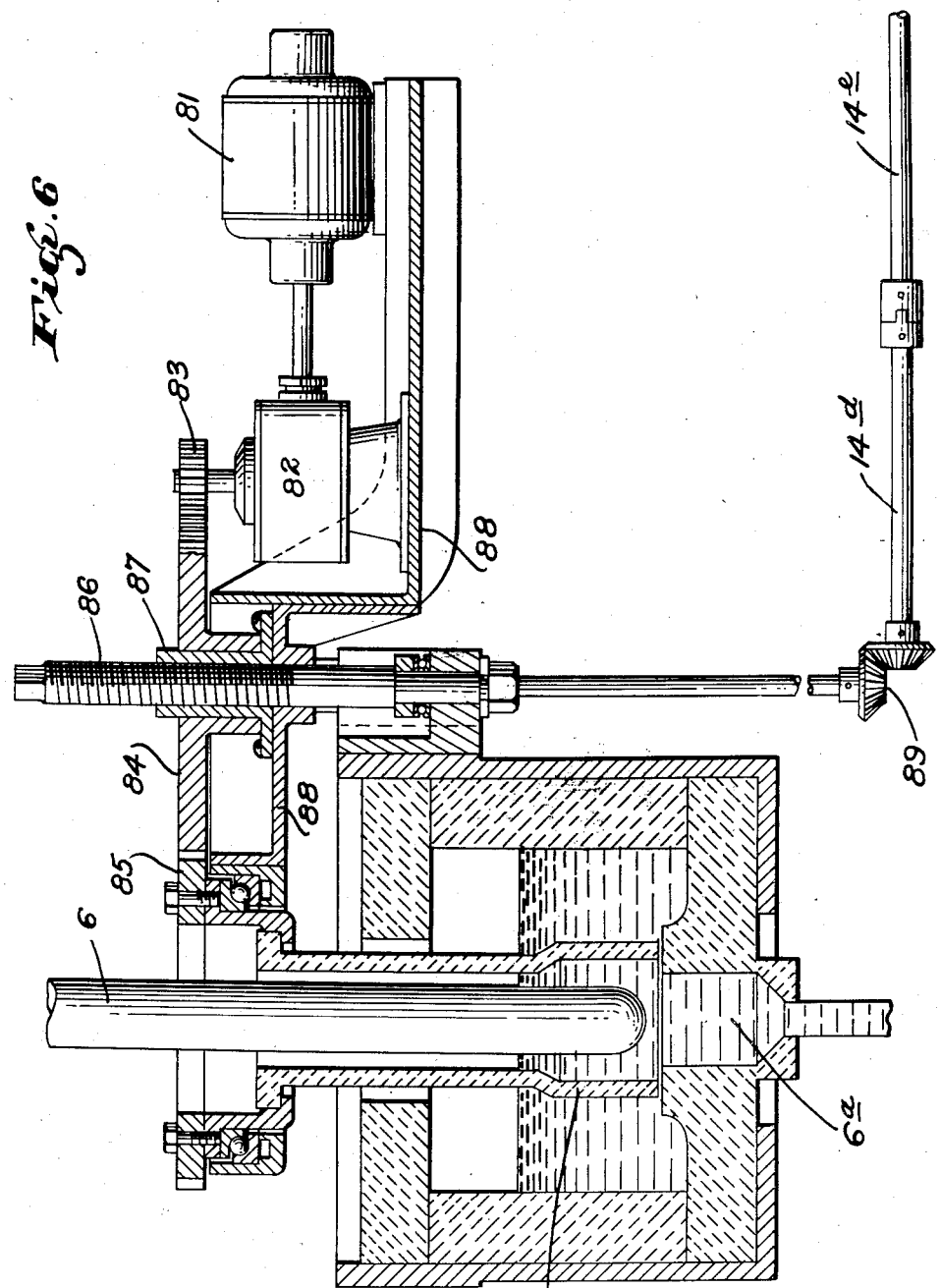

1,941,552

UNITED STATES PATENT OFFICE 1,941,552

APPARATUS FOR AUTOMATICALLY CONTROLLING THE WEIGHT OF GLASS ARTICLES MADE BY THE GOB FEED AUTOMATIC MACHINE PROCESS

Kenneth M. Henry and Burton A. Noble, San Francisco, Calif., assignors, by mesne assignments, to Hartford-Empire Company, Hartford, Conn., a corporation of Delaware Application June 30, 1931. Serial No. 547,802

15 Claims. (Cl. 49—55)

This invention relates to apparatus for automatically controlling the weight of glass articles made by the gob feed automatic machine process.

One of the most important considerations in the manufacture of bottles and glassware by the automatic machine process, is the correctness and uniformity of the weight of glass used in fabricating the article. Since glassware is blown or pressed in a mold, the capacity of hollow ware, such as bottles, depends directly on the weight of glass used in its manufacture. Obviously, uniform and correct capacity is a prime requisite of high quality ware.

The weight of the gobs produced by a glass feeder depends on a number of factors: the size of the orifice through which the glass flows; the vertical position, speed up and down, and length of stroke of the plunger; the relative time interval of the plunger operations and the shears; and the viscosity of the glass. All of these factors except the last are functions of the feeder mechanism, and thus are subject to exact control. The viscosity of the glass, however, is a function of glass temperature, and no satisfactory means has yet been devised for maintaining the glass temperature in the feeder constant at the correct operating point for a given glass article.

Since it has not been found possible to control the glass temperature within the required limits, various expedients have been devised for maintaining the weight of manufactured articles uniform and at the proper value. Control of the means of heating the glass and the feeder is inadequate since the temperature changes in the glass can not be made rapidly enough to avoid difficulty. In view thereof, various devices such as the following, have been employed.

1. The weight of the gobs produced can be varied by changing the position of the plunger vertically with respect to the discharge orifice.

2. In feeders employing an annular revolving tube around the plunger the weight of the gobs may be varied by raising or lowering the tube with respect to the discharge orifice.

3. The weight of the gobs may be varied by changing the speed of all operations simultaneously, including the cycle of the plunger, the operation of the shears, and the intermittent rotation of the turret or machine supporting the molds. While these devices have been used and are being used, it should be understood that they are all manually controlled and that their successful operation is largely dependent upon the care and constant attention of one or more attendants.

Experiments have shown that relatively small temperature changes in the molten glass does not materially vary the cross section of a gob but it does materially vary the length thereof and as a consequence the weight of the gob formed during a predetermined time period. The fact, found by experiments, that the cross section of the gob does not vary materially during relatively small temperature changes suggested a method of controlling the final weight of the gob, to-wit, that of controlling the length of the gob. The present invention embodies a method and apparatus for insuring the formation of gobs of a predetermined weight by automatically controlling the length of the gob.

One form of apparatus employed is shown by way of illustration in the accompanying drawings, in which—

Fig. 3 is an enlarged end view of the circuit making and breaking mechanism.

Fig. 4 is a side elevation of the same.

Fig. 5 is an enlarged side elevation of the electrically actuated ratchet mechanism.

Fig. 6 shows a modified form of the glass feed.

Figure 1:
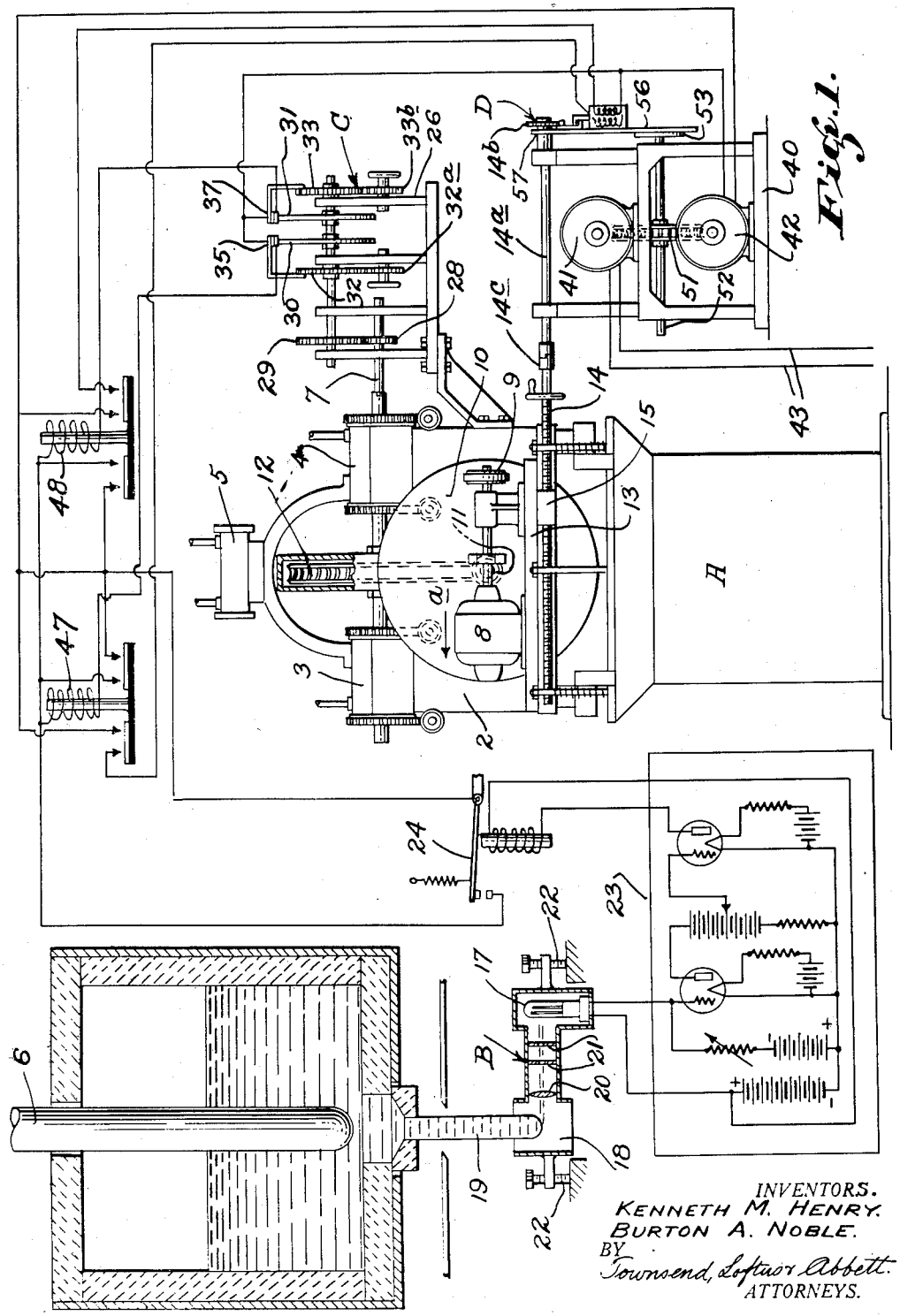
Fig. 1 is a diagrammatic view showing one form of apparatus which may be employed.

In the operation of machines for the molding of glassware, such as bottles and the like, a number of cooperating mechanisms are required, such as a glass furnace, a mechanism whereby the molten glass is discharged from the furnace in the form of gobs, shearing mechanism whereby the gobs are cut off, together with mechanism for transmitting an intermittent movement to the turret whereby the molds are carried, etc.

The several mechanisms referred to are usually pneumatically operated and means must accordingly be provided whereby air or another fluid under pressure is delivered at the proper moment to actuate the mechanisms, as close timing and coordination between the several mechanisms must be maintained if uniformity of product, output and efficiency are to be maintained.

The mechanism employed in the present instance comprises a rotary valve mechanism which is fully disclosed in Patent Number 1,777,758, issued to H. T. Mathieson, October 7, 1930, and entitled "Valve driving and timing mechanism".

In view of the complete disclosure of the valve mechanism employed in the patent above referred to a brief description will suffice. By referring to Fig. 1 of the drawings, a base or pedestal member is indicated at A. Supported by this base is a housing generally indicated at 2 and mounted on said housing are three valves 3, 4 and 5. The valve 3 controls the flow and exhaust of air to the pneumatic mechanism which operates the shears. The valve indicated at 4 controls the flow and exhaust of air to the pneumatic mechanism which imparts an intermittent movement to the turret which, as previously stated, carries the molds, and the valve indicated at 5 controls the delivery and exhaust of air to the mechanism which operates the glass feed, to-wit, the plunger indicated at 6. The valves are of the rotary type; the valves 3 and 4 being driven by a common shaft 7 which in turn is driven from an electric motor 8 and an intermediate friction speed drive comprising a driving disc 9 and a driven disc 10. The latter disc drives a shaft 11 on which is mounted a worm pinion and this pinion meshes with a worm gear 12 secured on the shaft 7. The motor 8, together with the driving disc 9, is mounted on a bed plate 13 and this is adapted to be reciprocated through means of a screw shaft 14 passing through a nut 15 secured to the bed plate. By rotating the screw shaft 14 in one direction the motor and driving disc 9 move in the direction of arrow $a$, hence increasing the speed of the valve shaft 7. Conversely, rotation of the screw shaft 14 in the opposite direction moves the driving disc 9 outwardly with relation to the center of the disc 10 and as such decreases the speed of the driving shaft 7. When the speed of the shaft 7 is retarded all operations such as feeding, shearing, etc., are slowed down and conversely when the speed of the shaft 7 and the valves actuated thereby is increased the operations of feeding the glass, cutting it off, delivering it to the molds, and so on, is increased.

It has already been stated that one method of obtaining glass gobs of a uniform weight is that of increasing or decreasing the speed of the entire machine and that is accomplished in the present instance by rotating the screw shaft 14 so as to increase or decrease the speed of the shaft 7 and the valve mechanism actuated thereby. This operation is, however, manual and the quality of the ware finally produced will accordingly depend upon the human element. In the present instance the operation of maintaining a glass gob of uniform weight is accomplished entirely by automatic means. To accomplish this a number of groups of mechanisms are required, first a measuring device generally indicated at B; secondly, a circuit making and breaking mechanism generally indicated at C; and third, an electrically actuated ratchet mechanism generally indicated at D whereby motion is transmitted to automatically rotate the screw feed shaft 14 in one direction or another depending upon whether it is necessary to increase or decrease the speed of all operations.

The measuring mechanism indicated at B comprises a substantially light proof housing in one end of which is mounted a photoelectric cell 17. Formed at the opposite end of the housing is a passage 18 which aligns with a glass gob indicated at 19 and interposed between said passage and the photoelectric cell is a lens 20 and a pair of slotted diaphragms 21. The housing, together with the photoelectric cell is vertically adjustable as indicated at 22 and provides one means whereby the length of the gob may be adjusted.

Connected with the photoelectric cell 17 is an amplifier 23 of suitable construction and connected with the output side of the amplifier is a relay switch 24, the function of which will hereinafter be described.

The circuit making and breaking mechanism generally indicated at C is best illustrated in Figs. 1, 2, 3 and 4. It comprises a base plate 25 on which are mounted standards 26. Journaled in said standards are shafts 7 and 27 and connecting said shafts are gears 28 and 29. Shaft 7 is an extension of the valve shaft 7 already described. This shaft, as previously stated, rotates continuously and as such transmits motion through the gears 28 and 29 which causes rotation of shaft 27 at a continuous but reduced speed, the speed reduction being in this instance three to one. Secured on the shaft 27 are a pair of cam discs 30 and 31 and freely turnable on the shaft 27 are a pair of gears 32 and 33. Carried by the gear 32 is a bracket arm which supports a switch 35 and similarly secured on the gear 33 is a bracket 36 which supports a switch 37. Intermeshing with the gears 32 and 33 are gears $32a$ and $33b$. Each gear is provided with a hand wheel or knob as shown and each of the gears, together with the intermeshing gears 32 and 33, may accordingly be independently rotated to adjust the position of the switches 35 and 37 as will hereinafter be described.

Figure 2:
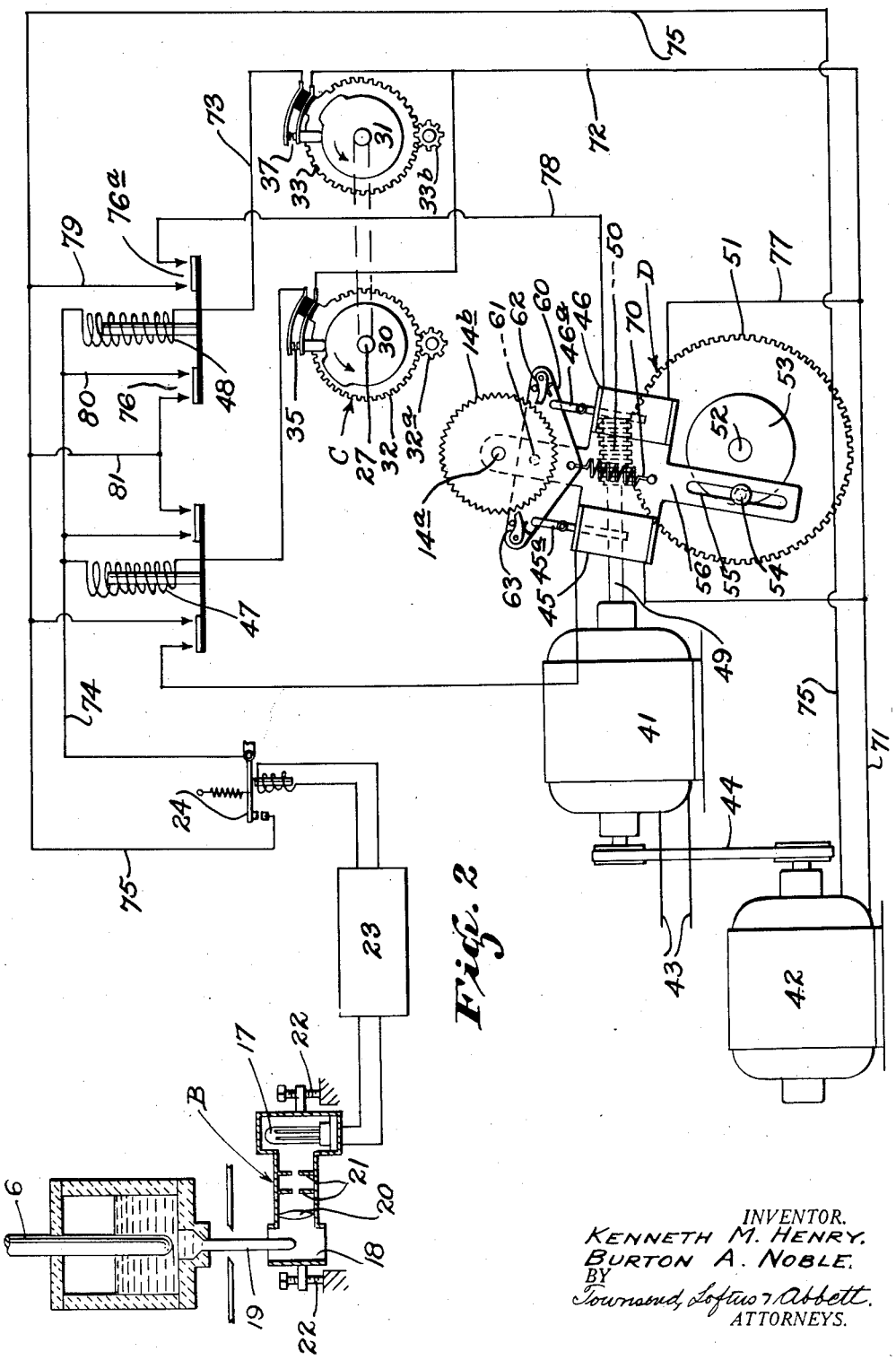
Fig. 2 is a diagrammatic view of an enlarged scale in which the circuit making and breaking mechanism, the electrically actuated ratchet mechanism and the relay switches 47 and 48 are particularly shown.

The electrically actuated ratchet mechanism generally indicated at D whereby motion is transmitted to automatically rotate the screw feed shaft 14 in one direction or another, depending upon whether it is necessary to increase or decrease the speed of all operations, is best illustrated in Figs. 1, 2 and 5. This mechanism comprises a frame generally indicated at 40 in which is mounted a driving motor 41 and a generator 42. The motor 41 is connected through wires 43 with any suitable source of current supply. The motor is connected through a belt and pulley as indicated at 44 with the generator 42 to drive the same and the current produced by the generator is employed for the purpose of energizing or actuating a pair of solenoid magnets generally indicated at 45 and 46 and also to energize and actuate a pair of relay switches indicated at 47 and 48. The shaft of the motor 41 indicated at 49 is extended as shown in Fig. 5 and its outer end carries a worm pinion shown in dotted lines at 50 in Figs. 2 and 5. This worm pinion intermeshes with a worm gear 51 which is secured to a shaft 52 journaled in the frame 40 and disposed at right angles to the motor shaft 49. Secured on one end of the shaft 52 is a disc 53 and projecting from the face thereof is a crank pin 54. This pin projects through a slot 55 formed in a rocker arm 56, which is pivotally supported at its upper end as at 57 on an extension $14a$ of the screw shaft 14. The rocker arm 56 carries a bracket plate on which the solenoid magnets 45 and 46 are secured. The rocker arm also supports a triangular shaped plate indicated at 60. This plate is pivotally attached to the rocker arm at the point indicated at 61 and it forms a support for a pair of pawls indicated at 62 and 63. A stop pin is disposed above each pawl and a cooperating spring normally maintains each pawl in engagement with the respective stop pins. The solenoid magnets 45 and 46 are connected with the triangular plate 60 through means of links $45a$ and $46a$ and a rocking movement may accordingly be transmitted to the triangular plate and the pawls carried thereby when one or another of the magnets are energized. The shaft extension 14a carries a ratchet wheel 14b which is adapted to be engaged by the pawls 62 and 63 and an intermittent movement may accordingly be transmitted to the shaft 14a and the screw feed shaft 14. By referring to Figs. 2 and 5, it will be noted that a spring 70 is employed. One end of the spring is attached to the lower end of the triangular plate 60 while the opposite end is attached to the rocker arm 56. The function of the spring is that of normally maintaining the triangular plate 60 in a position at right angles to the rocker arm 56. In this position the pawls 62 and 63 are held out of engagement with the ratchet wheel 14b, this being essential when gobs of correct weight are being discharged. As shaft 52 carrying the crank pin 54 is continuously rotating, rocking movement is continuously transmitted to the rocker arm 56, hence if the pawls 62 and 63 were not normally maintained out of engagement with the ratchet wheel 14b movement would be transmitted thereto in one direction or the other. It is only when the gobs are under or over weight that rotational movement is transmitted to the screw feed shaft 14. When the gobs are of proper or predetermined weight no movement is transmitted as neither of the solenoid magnets 45 or 46 will be energized.

Before describing the operation of the apparatus as a whole it might be stated that the gobs of glass discharging are molten and that the temperature thereof is so high that red and yellow light rays are emitted. For this reason a cæsium hydride photocell is preferably employed as this is exceedingly sensitive to the red and yellow light rays emitted by the gob. The output of the photoelectric cell is fed into the amplifier 23 and the output of the amplifier actuates the sensitive relay switch indicated at 24. The amplifier employed is designed to furnish approximately the following currents:

1. No current when light does not affect the photoelectric cell.
2. One milliampere when the gob passes the slits.

In describing the operation of the apparatus, three conditions will be explained: First, just what happens when the gob is of correct length and weight; secondly, what happens when the gob is too short and light in weight; and third, what happens when the gob is too long and therefore heavy.

If the gob is of correct length and therefore of correct weight, light will reach the photoelectric cell 17 the moment the lower end of the gob 19 aligns with the lens 20 and the slotted diaphragms 21. The cams 30 and 31 will at that instant be so positioned that both of the switches 35 and 37 will be open, hence the relays 47 and 48 will not be energized and the relay 24 will open the moment the gob is cut by the shears and drops through the opening 18.

If the gob is too short and therefore of light weight, the gob will not have attained sufficient length to affect the photoelectric cell 17 before the shears cut it off. Therefore switch 35 will have opened and switch 37 will have closed before the gob affects the photoelectric cell as it falls. Under this condition when the gob is cut and falls the photoelectric cell 17 will be actuated and the output of the amplifier 23 will be sufficient to close the relay switch 24, and as the switch 37 is closed the following additional circuit will be closed: Commencing with the generator 42 current will pass through the wire 71, wire 72, switch 37, wire 73 and the coil of the relay switch 48. The current will then pass through the opposite terminal of said coil and wire 74. This connects with relay switch 24 and as this is closed the current will pass through said switch and wire 75 which completes the circuit through the generator. Energization of the relay switch 48 by current flow through the coil surrounding the same causes the raising of a pair of switches indicated at 76 and 76a. Switch 76a closes a circuit through the solenoid magnet 46 which can be traced as follows: Commencing with the generator the current flows through wire 71 and wire 77, then through the coil of the solenoid magnet 46 and wire 78. This wire is connected with the switch 76a and as this switch is closed it will pass through the same and wire 79 which connects with the return wire 75. A holding circuit is at the same time closed through the switch 76. This circuit can be traced as follows: Commencing with the generator 42, current passes through wire 71, wire 72, switch 37, wire 73, the coil of the relay switch 48, and wire 80 which connects with the holding switch 76 and as this is closed the current passes through the switch and wire 81 which connects with the return wire 75. The holding switch is essential as the circuit established through the coil of the relay 48 by the closing of the relay switch 24 is only momentary. Once it is closed by this switch a second circuit is closed through the relay switch 76 and this is not broken until the circuit through the switch 37 is broken.

It should be stated that when the apparatus is in operation motor 41 is continuously operating and it has two functions: First that of supplying current to operate the solenoid magnets 45 and 46 and the relay switches 47 and 48; and secondly, that of transmitting a continuous oscillating or rocking movement to the arm 56, this being accomplished as previously stated through the worm gear drive disclosed and the crank pin 54. When magnet 46 becomes energized as described the end of the triangular plate 60 to which the magnet is connected is pulled downwardly, hence swinging the opposite end of the triangular plate upwardly where the pawl 63 comes into engagement with the teeth of the ratchet wheel 14b. During such engagement the ratchet wheel 14b and the screw feed shaft 14 will be rotated in a clockwise direction, hence moving the motor 8 in a direction opposite to arrow a and decreasing the speed of the shaft 7 and the valves actuated thereby. Such decrease in speed slows down the operations of the plunger 6, the shears, the turret, etc., hence permitting the gobs to become longer. The holding switch 76 will cause the relay 48 to remain closed and cause the correcting operation to continue until switch 37 opens. The time period during which correction takes place depends upon the length of the raised portion of the cams 30 and 31 and the speed ratio of the gears 28 and 29.

If the gob is too long and therefore heavy the gob will affect the photoelectric cell while the switch 35 is still closed, thus when the sensitive relay 24 closes, relay switch 47 will be closed. The solenoid magnet 45 will be energized, the triangular plate 60 will be rocked in the opposite direction causing pawl 62 to engage the ratchet wheel 14b and thereby rotate the screw feed shaft 14

14 in a counter-clockwise direction thus causing the motor 8 and driving disc 9 to be moved inwardly or in the direction of arrow *a*, thereby speeding up the shaft 7 and the valves actuated thereby. These, in turn speed up the operations of the plunger 6, the shears, the turret and so on, and the operation of maintaining the gob at a predetermined length and weight is thus automatically accomplished.

It was previously stated that the apparatus disclosed was particularly intended for use in connection with automatic machines whereby hollow glassware such as bottles and the like are manufactured. The output of a machine of this character is proportional to the weight of the bottle. For instance, if an eight ounce bottle is being manufactured the output may be eighteen bottles per minute and the weight of the gobs discharged will be eight ounces. If a twelve ounce bottle is to be manufactured the output will be slightly less, for instance, fifteen bottles per minute. This is due to the fact that more time must be given to the formation of the twelve ounce gobs if the conditions governing the issuance of glass from the discharge orifice remain substantially as before. The change from a bottle of one weight to that of a greater weight is accomplished by lowering the housing B through means of the adjusting screws indicated at 22 as this permits the formation of a longer and therefore heavier gob. The change in weight may also be slightly affected by adjusting the position of the switches 35 and 37 through means of the adjusting knobs attached to the gears 32a and 32b. The speed of the entire machine will be slowed down when a heavier gob is being formed and it is therefore also necessary to re-adjust the position of the driving disc 9. This is accomplished by uncoupling the clutch indicated at 14c, see Fig. 1, and rotating the screw feed shaft 14 in a direction so that the motor 8 and driving disc will be moved outwardly or in a direction opposite to that indicated at arrow *a*. It will accordingly be noted that the operation of adjusting the apparatus when changing from one weight bottle to another is fairly simple and can be quickly accomplished.

In the apparatus shown in Fig. 1, the weight of the gob is automatically controlled by speeding up or slowing down the several operations. This is not the only method whereby the weight of the gob can be controlled. For instance, by referring to the modified structure shown in Fig. 6 it can be accomplished by raising or lowering the tube indicated at 80. The tube 80 is continuously rotated from an electric motor 81 through a reduction gear drive 82 and the gears indicated at 83, 84 and 85. The tube 80 surrounds the plunger 6 and it may be raised or lowered with relation to the discharge orifice 6a through means of a screw feed shaft 86. This shaft passes through a nut 87 secured in a frame 88. This frame supports the motor 81, the reduction gears, and the tube 80. It is raised and lowered with relation to the glass container through means of the screw feed shaft 86 and as the tube 80 is carried by the frame 88 the amount of glass discharged may be varied. The screw feed shaft 86 is connected with shaft 14d through means of gears 89 and the shaft 14d is in turn connected with the electrically actuated ratchet mechanism and ratchet wheel 14b through means of shaft 14e. Hence in place of slowing or speeding up the several operations of the machine it is possible to maintain the output at a constant rate and to vary the weight of the gob by merely raising or lowering the tube 80. As this is automatically actuated through the same type of apparatus previously described the operation is entirely automatic.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

No claim is made herein specific to the control of the weight or characteristics of the suspended mold charge masses by automatic adjustment under control of the photo-electric means of the operating position of a discharge regulating tube or other glass discharge-regulating implement or by adjustment by automatic means controlled by the photo-electric means of one operating part of a feeder relative to or independently of another part of the feeder or by such adjustment of means for heating the glass in the glass feeding container. Such specific subject matters are included in the invention of Everett O. Hiller, as disclosed and claimed in his application Serial No. 543,255, filed June 10, 1931, for "Photo electric control of glass feeders", owned by the owner of the present application.

The broader of the claims of the present application are directed to the broad or generic invention which provides for measurement of "suspended" mold charges by automatic means, specifically a photo-electric device, out of contact with the glass of the charges but sensitive to variations in the respective charges and the automatic regulation or step of regulating discharge of glass for each later-produced charge to obviate variations of the preceding charge from the normal. The more specific of the claims are directed to means for or the method of making use of the photo-electrically controlled means to vary the speed of operation of the "suspended charge" feeding machine to correct in later produced charges variations of preceding charges from the normal, as by varying the speed of a timer which controls the speed of the operating parts of the feeding machine and may also control the operation of an associate glassware fabricating machine.

Having thus described our invention, what we claim and desire to secure by Letters Patent is—

1. In a glass feeding machine, a container for molten glass, said container having a discharge orifice formed therein, a housing disposed adjacent to the path of gobs discharging from said orifice, a photoelectric cell in said housing actuated by light rays emitted by the gobs, and means actuated by the photo electric cell whereby the flow of glass through the discharge orifice is varied to maintain the gobs at a predetermined weight.

2. In a glass gob feeding machine, a container for molten glass, said container having a discharge orifice formed therein, a housing disposed adjacent to the path of gobs discharging from said orifice, a photoelectric cell in said housing actuated by light rays emitted by the gobs, means actuated by the photoelectric cell whereby the flow of glass through the discharge orifice is varied to maintain the gobs at a predetermined weight, and means for adjusting the position of the housing and the photoelectric cell to change the length and the weight of the gobs.

3. In a glass gob feeding machine, a container for molten glass, said container having a discharge orifice formed therein, feeding means cooperating with the discharge orifice whereby gobs are intermittently discharged, a housing disposed adjacent to the path of the discharging gobs, a photoelectric cell in said housing actuated by light rays emitted by the gobs, a relay switch actuated by the photoelectric cell, and means actuated by the relay switch whereby the flow of glass through the discharge orifice is varied to maintain the gobs at a predetermined weight.

4. In an apparatus of the character described, a plurality of valves, a variable speed drive through which the valves are operated at different speeds, a container for molten glass, said container having a discharge orifice formed therein through which glass gobs are discharged, feeding means actuated by the valves and controlling the discharge of glass, and means actuated by the discharging glass gobs without contact therewith for controlling the variable speed drive so as to increase or decrease the speed of operation of the valves and thereby the glass feeding means in accordance with an increase or decrease in weight of a glass gob from the weight desired.

5. In an apparatus of the character described, a plurality of valves, a variable speed friction drive whereby the valves are operated in which the driving member is radially movable to increase or decrease the speed of the valves, a container for molten glass, said container having a discharge orifice formed therein from which glass gobs are discharged, a mechanism whereby radial movement is transmitted to the driving member of the friction drive, means actuated by the valves for varying a flow of glass through the discharge orifice, and means actuated by the discharging glass gobs without contact therewith and in response to a change in weight of a glass gob from the weight desired, for actuating the mechanism whereby the driving member of the friction speed drive is moved radially.

6. In an automatic glass feeding mechanism comprising a discharge outlet, means for controlling the discharge of glass therefrom and into suspension therebeneath, means for severing charges from the suspended masses, and automatic control means out of contact with the glass and responsive to variations in the length of each suspended mass for varying the discharge controlling means whereby to correct variations from the normal in succeeding suspended masses.

7. In mechanism for feeding molten glass in suspended mold charges in combination, a container for the glass having a submerged discharge outlet, means for regulating the amount of glass flowing through said outlet and into suspension within a given period of time, and means out of contact with but sensitive to variations in the size of the glass suspended from the outlet for varying the regulating means to correct the variations to which said controlling means is sensitive.

8. In a glass feeder of the suspended charge type having adjustable means for controlling the discharge and suspension of successive glass masses, and periodically acting shears for severing a charge from each mass, automatic controlling means to vary the rate of discharge of glass and downward extension of the mold charge masses in response to variations from the normal in the length of preceding masses, including a photo-electric cell, a relay, and a pair of circuit making and breaking devices, and means for adjusting the circuit making and breaking devices during the operation of the feeder to vary the times at which the control means is responsive to the length of the suspended masses and to thereby vary the extent of variations from the normal in the length of charges which may occur without correction of the rate of discharge by the automatic control means.

9. In a device for automatically feeding molten glass in suspended mold charges, a container for a supply of molten glass having a submerged outlet, means to regulate the rate at which glass passes through the outlet into successive suspended masses which extend downwardly past a severing plane, shears periodically acting to sever a mold charge from each of the successive suspended masses, and automatic control mechanism for the regulating means including a photo-electric cell responsive to the presence or absence of light emanating from the mold charge masses, and means acting in selected time relation to the severing action of the shears to determine the transmission to the regulating means of the response of the photo-electric cell to the light from the mold charge masses.

10. In a device for automatically feeding molten glass in suspended mold charges, a container for a supply of molten glass having a submerged outlet, means to regulate the rate at which glass passes through the outlet into successive suspended masses which extend downwardly past a severing plane, shears periodically acting to sever a mold charge from each of the successive suspended masses, automatic control mechanism for the regulating means including a photo-electric cell responsive to the presence or absence of light emanating from the mold charge masses, means acting in selected time relation to the severing action of the shears to determine the transmission to the regulating means of the response of the photo-electric cell to the light of the mold charge masses, and means for varying the time relation of said last-named means and the shears.

11. The combination with automatic glass feeding mechanism comprising a container for molten glass having a glass discharge outlet, means controlling the discharge of glass from said outlet into suspension therebelow so as to produce successive suspended mold charge masses, and means for severing mold charges from said masses, of a photo-electric cell arranged to be affected by light from each mold charge mass at a predetermined distance below the outlet, and means controlled by said photo-electric cell for varying the operation of said discharge controlling means whenever a mold charge mass varies from predetermined characteristics so as to obviate a like variation in a subsequently produced mold charge mass.

12. The combination with a mechanism for feeding molten glass in successive suspended mold charge masses and periodically operating severing mechanism for severing mold charges from said suspended mold charge masses, of automatic means directly responsive, without physical contact with the glass, to variations from the normal of the characteristics of a suspended mold charge mass, for regulating the feeding mechanism as required to obviate corresponding variations in a subsequently produced suspended mold charge mass.

13. The combination with glass feeding mechanism including a container for molten glass having a discharge outlet, means operating in the glass in the container to regulate discharge of glass through the outlet to aid in producing successive suspended mold charge masses, and means for severing mold charges from said suspended mold charge masses, of a photo-electric cell arranged to be affected by light from said charge masses at a predetermined level below the outlet, and means controlled by said photoelectric cell for varying the speed of operation of said discharge regulating means whenever a mold charge mass varies from predetermined characteristics so as to obviate a like variation in a subsequently produced mold charge mass.

14. The combination with a glass feeding mechanism comprising a container having a submerged discharge outlet, means operating in the glass in the container for controlling discharge of glass from the outlet into suspension therebeneath, means for severing mold charges from the suspended mold charge masses, and timing mechanism controlling the operations of the severing mechanism, the discharge controlling means, and an associate glassware fabricating machine, of means directly responsive to variations from the normal of a suspended mold charge mass and acting without contact with such mass for adjusting said timing mechanism to vary the speed of said operations as required to obviate corresponding variations in subsequently produced suspended mold charge masses.

15. The combination with a device for feeding molten glass in successive suspended mold charge masses, severing means for severing mold charges from said suspended masses, and a timing mechanism controlling the frequency of production of said suspended mold charge masses and of said severing operations, and synchronizing such operations with the operations of an associate glassware fabricating machine, of a photo-electric cell arranged to receive light from said mold charge masses at a predetermined level spaced below the plane of suspension of each of said masses, and means controlled by said photoelectric cell for regulating the timing mechanism whenever a suspended mold charge mass varies from predetermined limits to obviate corresponding variations in subsequently produced suspended mold charge masses.

KENNETH M. HENRY.
BURTON A. NOBLE.